(12) United States Patent
Conrad et al.

(10) Patent No.: US 11,273,576 B2
(45) Date of Patent: Mar. 15, 2022

(54) DEVICE AND METHOD FOR PRODUCING PLASTIC GRANULATE

(71) Applicant: Coperion GmbH, Stuttgart (DE)

(72) Inventors: Ulrich Conrad, Elze (DE); Norbert Kern, Tamm (DE); Markus Schmudde, Murr (DE); Bernhard Stöhrer, Pleidelsheim (DE); Heiko Hornberger, Hessigheim (DE)

(73) Assignee: COPERION GMBH, Stuttgart (DE)

( * ) Notice: Subject to any disclaimer, the term of this patent is extended or adjusted under 35 U.S.C. 154(b) by 285 days.

(21) Appl. No.: 16/325,951

(22) PCT Filed: Jul. 27, 2017

(86) PCT No.: PCT/EP2017/068949
§ 371 (c)(1),
(2) Date: Feb. 15, 2019

(87) PCT Pub. No.: WO2018/033355
PCT Pub. Date: Feb. 22, 2018

(65) Prior Publication Data
US 2019/0202088 A1 Jul. 4, 2019

(30) Foreign Application Priority Data

Aug. 17, 2016 (EP) .................... 16184551

(51) Int. Cl.
*B29B 9/12* (2006.01)
*B29B 9/06* (2006.01)
(Continued)

(52) U.S. Cl.
CPC ............... *B29B 9/12* (2013.01); *B29B 7/603* (2013.01); *B29B 7/88* (2013.01); *B29B 9/065* (2013.01);
(Continued)

(58) Field of Classification Search
CPC ..... B29B 2009/125; B29B 7/603; B29B 7/88; B29B 9/065; B29B 9/12; B29B 9/16
See application file for complete search history.

(56) References Cited

U.S. PATENT DOCUMENTS

| 5,895,617 A | 4/1999 | Mizuguchi et al. |
| 2008/0093763 A1 | 4/2008 | Mancosh et al. |

(Continued)

FOREIGN PATENT DOCUMENTS

| DE | 102 30 321 A1 | 1/2004 |
| DE | 10 2004 002 401 A1 | 8/2005 |

(Continued)

*Primary Examiner* — Robert J Grun
(74) *Attorney, Agent, or Firm* — McGlew and Tuttle, P.C.

(57) ABSTRACT

A device for producing dyed plastic granulate and undyed plastic granulate includes a multi-shaft screw extruder and an underwater pelletizing installation. A granulate change-over unit which separates the dyed plastic granulate from the undyed plastic granulate is disposed in a conveying direction downstream of the underwater pelletizing installation. The dyed plastic granulate is separated from the pelletizing water via a first separator installation, and the undyed plastic granulate is separated from the pelletizing water via a second separator installation. The separator installations are disposed so as to be mutually parallel. The device enables a simple, flexible and economical selective production of the dyed plastic granulate and the undyed plastic granulate.

21 Claims, 3 Drawing Sheets

(51) Int. Cl.
*B29B 9/16* (2006.01)
*F26B 17/00* (2006.01)
*B29B 7/60* (2006.01)
*B29B 7/88* (2006.01)
*B29C 48/405* (2019.01)
*B29C 48/04* (2019.01)
*B29C 48/00* (2019.01)

(52) U.S. Cl.
CPC .............. *B29B 9/16* (2013.01); *B29C 48/405* (2019.02); *F26B 17/00* (2013.01); *B29B 2009/125* (2013.01); *B29C 48/0022* (2019.02); *B29C 48/04* (2019.02); *F26B 2200/08* (2013.01)

(56) References Cited

U.S. PATENT DOCUMENTS

| | | |
|---|---|---|
| 2009/0134537 A1 | 5/2009 | Eloo et al. |
| 2013/0228308 A1 | 9/2013 | Abhar |
| 2016/0075053 A1 | 3/2016 | Conrad et al. |
| 2018/0100061 A1* | 4/2018 | Yamaguchi ............. B32B 27/08 |

FOREIGN PATENT DOCUMENTS

| | | |
|---|---|---|
| DE | 20 2013 001692 U1 | 5/2014 |
| DE | 10 2014 110 337 A1 | 1/2016 |

* cited by examiner

DEVICE AND METHOD FOR PRODUCING PLASTIC GRANULATE

CROSS REFERENCE TO RELATED APPLICATIONS

This application is a United States National Phase Application of International Application PCT/EP2017/068949 filed Jul. 27, 2017, and claims the benefit of priority under 35 U.S.C. § 119 of European patent application Serial No. EP 16 184 551.6, filed on Aug. 17, 2016, the entire contents of which are incorporated herein by reference.

TECHNICAL FIELD

The invention relates to a device and to a method for producing plastic granulate.

TECHNICAL BACKGROUND

A device and a method for producing plastic granulate by means of a screw extruder and an underwater pelletizing installation is known from DE 10 2004 002 401 A1. A device of this type is used either exclusively for producing dyed plastic granulate, or exclusively for producing undyed plastic granulate, thus plastic granulate of natural color. A selective production of dyed and undyed plastic granulate by way of a device of this type is not possible since dyed plastic granulate would contaminate the undyed plastic granulate, and the undyed plastic granulate as such would no longer be marketable.

SUMMARY

The invention is based on the object of achieving a device which in a simple, flexible and economical manner enables the selective production of dyed and undyed plastic granulate.

This object is achieved by a device for producing plastic granulate, having a multi-shaft screw extruder for providing a plastic melt; an underwater pelletizing installation for producing from the plastic melt plastic granulate that is located in the pelletizing water, a granulate changeover unit for separating dyed plastic granulate and undyed plastic granulate, said granulate changeover unit in a conveying direction being disposed downstream of the underwater pelletizing installation; a first separator installation for separating the dyed plastic granulate from the pelletizing water, said first separator installation in the conveying direction being disposed downstream of the granulate changeover unit; and a second separator installation for separating the undyed plastic granulate from the pelletizing water, said second separator installation being disposed downstream of the granulate changeover unit in the conveying direction and so as to be parallel with the first separator installation. It has been acknowledged according to the invention that the multi-shaft screw extruder and the underwater pelletizing installation have sufficient self-cleaning, but the post-treatment of the plastic granulate that is disposed downstream of the underwater pelletizing installation has to be separated so as to avoid any contamination of undyed plastic granulate by dyed plastic granulate. A separation of the post-treatment into a first post-treatment circuit for the dyed plastic granulate and a second post-treatment circuit for the undyed plastic granulate, thus the plastic granulate of natural color, is possible on account of the granulate changeover unit that is disposed downstream of the underwater pelletizing installation. The granulate changeover unit is configured in such a manner, for example, that a discharge line of the underwater pelletizing installation, manually and/or automatically, is selectively connectable to a first conveying line of the first post-treatment circuit or a second conveying line of the second post-treatment circuit. The granulate changeover unit is preferably configured as a granulate turnout. Accordingly, a first separator installation for separating the dyed plastic granulate from the pelletizing water, and a second separator installation for separating the undyed plastic granulate from the pelletizing water are disposed downstream of the granulate changeover unit. The separator installations are disposed so as to be mutually parallel and are part of the respective associated post-treatment circuit. The first post-treatment circuit, or the first separator installation, respectively, in a transition period after the conversion from the production of the dyed plastic granulate to the production of the undyed plastic granulate serves in particular also for separating impure plastic granulate which still contains residual dyeing agent. On account of only a single multi-shaft screw extruder and a single underwater pelletizing installation being required, the complexity in terms of machine technology is significantly reduced such that the selective production of the undyed and the dyed plastic granulate is possible in a simple and economical manner. The selection between the first post-treatment circuit and the second post-treatment circuit is performed in a simple, rapid and flexible manner by activating or converting, respectively, the granulate changeover unit, such that high levels of flexibility and economy are guaranteed in the selective production of the dyed and the undyed plastic granulate. Cleaning is not required in the post-treatment circuit. The conversion from the production of the undyed plastic granulate to the production of the dyed plastic granulate is possible without problems since the dyed plastic granulate is not contaminated by the undyed plastic granulate. In the conversion of the production of the dyed plastic granulate to the production of the undyed plastic granulate, the first post-treatment circuit continues to be utilized in the transition period in which self-cleaning of the multi-shaft screw extruder and of the underwater pelletizing installation takes place, so as to avoid any contamination of the second post-treatment circuit and of the undyed plastic granulate. Additionally, a melt pump and/or a screen changeover installation which likewise carry out self-cleaning in the transition period can be disposed between the multi-shaft screw extruder and the underwater pelletizing installation.

A device configured such that a pelletizing water changeover unit for feeding pelletizing water from the first separator installation or the second separator installation to the underwater pelletizing installation is disposed between the separator installations and the underwater pelletizing installation guarantees a simple selective production of the dyed and the undyed plastic granulate. On account of the pelletizing water changeover unit it is reliably guaranteed that no mixing of the pelletizing water of the first post-treatment circuit and of the pelletizing water of the second post-treatment circuit takes place. The pelletizing waters thus remain mutually separated in the post-treatment circuit. Any contamination by dyed plastic granulate remaining in the pelletizing water is in particular avoided on account thereof. The pelletizing water changeover unit is configured in such a manner, for example, that a first pelletizing water infeed line of the first post-treatment circuit, or a second pelletizing water infeed line of the second post-treatment circuit, manually and/or automatically, is selectively connectable to an infeed line of the underwater pelletizing installation. The pelletizing water changeover unit is preferably configured as a pelletizing water turnout.

A device configured such that a first pelletizing water container is disposed between the first separator installation and the pelletizing water changeover unit, and a second pelletizing water container is disposed between the second separator installation and the pelletizing water changeover unit guarantees a simple selective production of the dyed and the undyed plastic granulate. On account of a dedicated pelletizing water container being disposed in the respective post-treatment circuit, a separation of the pelletizing water of the post-treatment circuits is guaranteed in a simple and reliable manner. Any contamination by dyed plastic granulate remaining in the pelletizing water is avoided in a simple manner on account thereof.

A device configured such that a first pelletizing water pump is disposed between the first separator installation and the pelletizing water changeover unit, and a second pelletizing water pump is disposed between the second separator installation and the pelletizing water changeover unit guarantees a simple selective production of the dyed and the undyed plastic granulate. On account of a dedicated pelletizing water pump being disposed in the respective post-treatment circuit, the separation of the pelletizing water of the post-treatment circuits is guaranteed in a simple and reliable manner. Any contamination by dyed plastic granulate remaining in the pelletizing water is avoided on account thereof. The respective pelletizing water pump is in particular disposed so as to be downstream of the respective pelletizing water container.

A device configured such that a pelletizing water container for feeding pelletizing water from the separator installations is disposed between the separator installations and the underwater pelletizing installation guarantees a simple selective production of the dyed and the undyed plastic granulate. On account of the pelletizing water from the first separator installation and from the second separator installation being collected in a common pelletizing water container, the mixed pelletizing water can be filtered and purified in a simple manner. Any contamination by dyed plastic granulate remaining in the pelletizing water is avoided in a simple manner on account thereof.

A device configured such that a pelletizing water pump is disposed between the separator installations, in particular between the pelletizing water container, and the underwater pelletizing installation guarantees a simple selective production of the dyed and the undyed plastic granulate. On account of a common pelletizing water pump being disposed in a common pelletizing water infeed line, simple feeding of the pelletizing water to at least one filter installation and to the underwater pelletizing installation is possible. The pelletizing water pump is preferably disposed downstream of the common pelletizing water container.

A device configured such that at least one filter installation is disposed between at least one of the separator installations, in particular between the pelletizing water container, and the underwater pelletizing installation guarantees a simple selective production of the dyed and the undyed plastic granulate. Simple cleaning of the pelletizing water is possible on account of the at least one filter installation. The at least one filter installation is disposed between at least one of the separator installations and a common pelletizing water container and/or between a common pelletizing water container and the underwater pelletizing installation, for example. Dyed plastic granulate and/or impure plastic granulate is preferably filtered from the pelletizing water by means of the at least one filter installation. The respective filter installation comprises at least one pelletizing water filter. The respective filter installation preferably has at least two pelletizing water filters which are disposed so as to be mutually parallel. The respective filter installation is in particular capable of being operated in such a manner that the at least two pelletizing water filters are capable of being operated conjointly and/or individually. Simple servicing or cleaning, respectively, and/or simple replacing of the respective pelletizing water filter are/is possible on account thereof.

A device configured such that the filter installation comprises at least two pelletizing water filters which are disposed so as to be mutually parallel guarantees a simple selective production of the dyed and the undyed plastic granulate. The pelletizing water filters are in particular capable of being operated conjointly and/or individually by means of shut-off elements. Simple servicing and/or simple replacing of the pelletizing water filters is possible on account thereof.

A device configured such that a color granulate changeover unit for separating dyed plastic granulate and impure plastic granulate in a changeover of the production from dyed plastic granulate to undyed plastic granulate is disposed downstream of the first separator installation guarantees a simple and economical selective production of the dyed and the undyed plastic granulate. A simple and reliable separation of the dyed plastic granulate and of the impure plastic granulate which is created in a transition period after the conversion of the production of the dyed plastic granulate to the production of the undyed plastic granulate is enabled on account of the color granulate changeover unit. The impure plastic granulate thus does not compromise the quality of the dyed plastic granulate. The impure plastic granulate can be marketed as such, or in a subsequent production of the dyed plastic granulate can be fed into the multi-shaft screw extruder and in this way be economically further processed. The color granulate changeover unit is configured in such a manner, for example, that the first separator installation, manually and/or automatically, is capable of being selectively connected to a classification line for the dyed plastic granulate or a classification line for the impure plastic granulate. The color granulate changeover unit is preferably configured as a color granulate turnout.

A device configured such that at least one first storage container for storing dyed plastic granulate, and at least one second storage container for storing impure plastic granulate are disposed downstream of the color granulate changeover unit guarantees a simple, flexible and economical selective production of the dyed and the undyed plastic granulate. Separate storing of the dyed plastic granulate and of the impure plastic granulate is possible in a simple manner on account of the color granulate changeover unit and the separate storage containers. The at least one second storage container, depending on the economics, in particular enables marketing of the impure plastic granulate or further processing in the multi-shaft screw extruder.

A device configured such that a return feed line for returning impure plastic granulate in the production of dyed plastic granulate is disposed from the at least one second storage container to the multi-shaft screw extruder guarantees an economical selective production of the dyed and the undyed plastic granulate. The return feed line enables the feeding of impure plastic granulate from the at least one second storage container to the multi-shaft screw extruder, and thus the further processing of the impure plastic granulate to a dyed plastic granulate.

A device configured such that a classification installation for classifying the impure plastic granulate is disposed between the color granulate changeover unit and a plurality of second storage containers increases the economy of the selective production of the dyed and the undyed plastic granulate. A classification of the impure plastic granulate into undersize, standard size, and oversize is possible on account of the classification installation. An associated second storage container is provided for the respective granulate size, thus the undersize, the standard size, and the oversize. Depending on the economics, the impure plastic granulate having a specific granulate size is either marketed or further processed in the multi-shaft screw extruder. For example, the impure plastic granulate having the standard size is marketed, whereas the impure plastic granulate having the undersize and the oversize is fed back into the multi-shaft screw extruder for further processing.

A device configured such that the multi-shaft screw extruder for feeding undyed plastic material comprises a first infeed opening, and for feeding dyeing agent and/or impure plastic granulate comprises a second infeed opening guarantees a simple and flexible selective production of the dyed and the undyed plastic granulate. Separate feeding of the undyed plastic material, thus of the pulverulent plastic material of natural color, for example, and of the dying agent is performed through the two separate infeed openings. The dying agent is fed, for example, as pulverulent dying agent and/or as masterbatch granulate having the dying agent bound therein, and/or as impure plastic granulate having residual dying agent bound therein. Any contamination by dying agent in the region of the infeed openings in the production of the undyed plastic granulate is avoided on account thereof.

A device configured such that the multi-shaft screw extruder comprises a housing having at least two mutually penetrating housing bores that are configured therein, and such that associated treatment element shafts are disposed so as to be rotatingly drivable in the at least two housing bores, said treatment element shafts being configured so as to mutually mesh in a tight manner and so as to scrape an internal wall of the housing guarantees a simple, flexible and economical selective production of the dyed and the undyed plastic granulate. On account of the at least two treatment element shafts being configured so as to mutually mesh in a tight manner, said treatment element shafts are self-cleaning in a simple manner. Moreover, the internal wall of the housing is cleaned in a simple manner on account of the scraping configuration. The following applies to a dimension $A_1$ of a gap between the at least two treatment element shafts and/or a dimension $A_2$ of a gap between the respective treatment element shaft and the internal wall of the housing in relation to an external diameter D of the treatment element shafts:

$0.003 \leq A_1/D \leq 0.05$, in particular $0.004 \leq A_1/D \leq 0.035$, and in particular $0.011 \leq A_1/D \leq 0.02$
and/or
$0.004 \leq A_2/D \leq 0.03$, in particular $0.005 \leq A_2/D \leq 0.025$, and in particular $0.012 \leq A_2/D \leq 0.019$.

The invention is furthermore based on the object of achieving a method which in a simple, flexible and economical manner enables the selective production of dyed and undyed plastic granulate.

This object is achieved by a method for producing plastic granulate, comprising the following method steps: providing a device for producing plastic granulate according to the invention; producing dyed plastic granulate by means of the multi-shaft screw extruder and the underwater pelletizing installation, and separating the dyed plastic granulate by means of the first separator installation; changing over the granulate changeover unit; producing undyed plastic granulate by means of the multi-shaft screw extruder and the underwater pelletizing installation, and separating the undyed plastic granulate by means of the second separator installation. The advantages of the method according to the invention correspond to the already described advantages of the device according to the invention.

A method according to which the granulate changeover unit is converted after a start of the production of the undyed plastic granulate, and impure plastic granulate that is created up to the conversion of the granulate changeover unit is separated by means of the first separator installation and of a downstream color granulate changeover unit guarantees an economical selective production of the dyed and the undyed plastic granulate. In a transition period after the start of the production of the undyed plastic granulate, the impure plastic granulate that is first created by virtue of residual dying agent continues to be fed to the first separator installation and by means of a downstream color granulate changeover unit is separated, or kept separate, respectively, from the dyed plastic granulate. Once the self-cleaning of the multi-shaft screw extruder and of the underwater pelletizing installation has been completed, the granulate changeover unit is converted, and the undyed plastic granulate then produced is fed to the second separator installation.

A method according to which the impure plastic granulate in a subsequent production of dyed plastic granulate is at least in part fed to the multi-shaft screw extruder guarantees an economical selective production of the dyed and the undyed plastic granulate. On account of feeding the impure plastic granulate to the multi-shaft screw extruder, further processing of the impure plastic granulate to the dyed plastic granulate is performed.

A method according to which a pelletizing water changeover unit is converted guarantees a simple and flexible selective production of the dyed and the undyed plastic granulate. The pelletizing water used for the production of the dyed and the undyed plastic granulate is kept separate on account of the pelletizing water changeover unit. Any contamination of the undyed plastic granulate by dyed plastic granulate remaining in the pelletizing water is avoided on account thereof.

A method according to which pelletizing water from at least one of the separator installations, prior to being fed to the underwater pelletizing installation, is filtered by means of at least one filter installation guarantees a simple and flexible selective production of the dyed and the undyed plastic granulate. The pelletizing water, prior to being fed into the underwater pelletizing installation, is filtered and purified by means of the at least one filter installation. Any contamination of the undyed plastic granulate by dyed plastic granulate remaining in the pelletizing water is avoided on account thereof.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
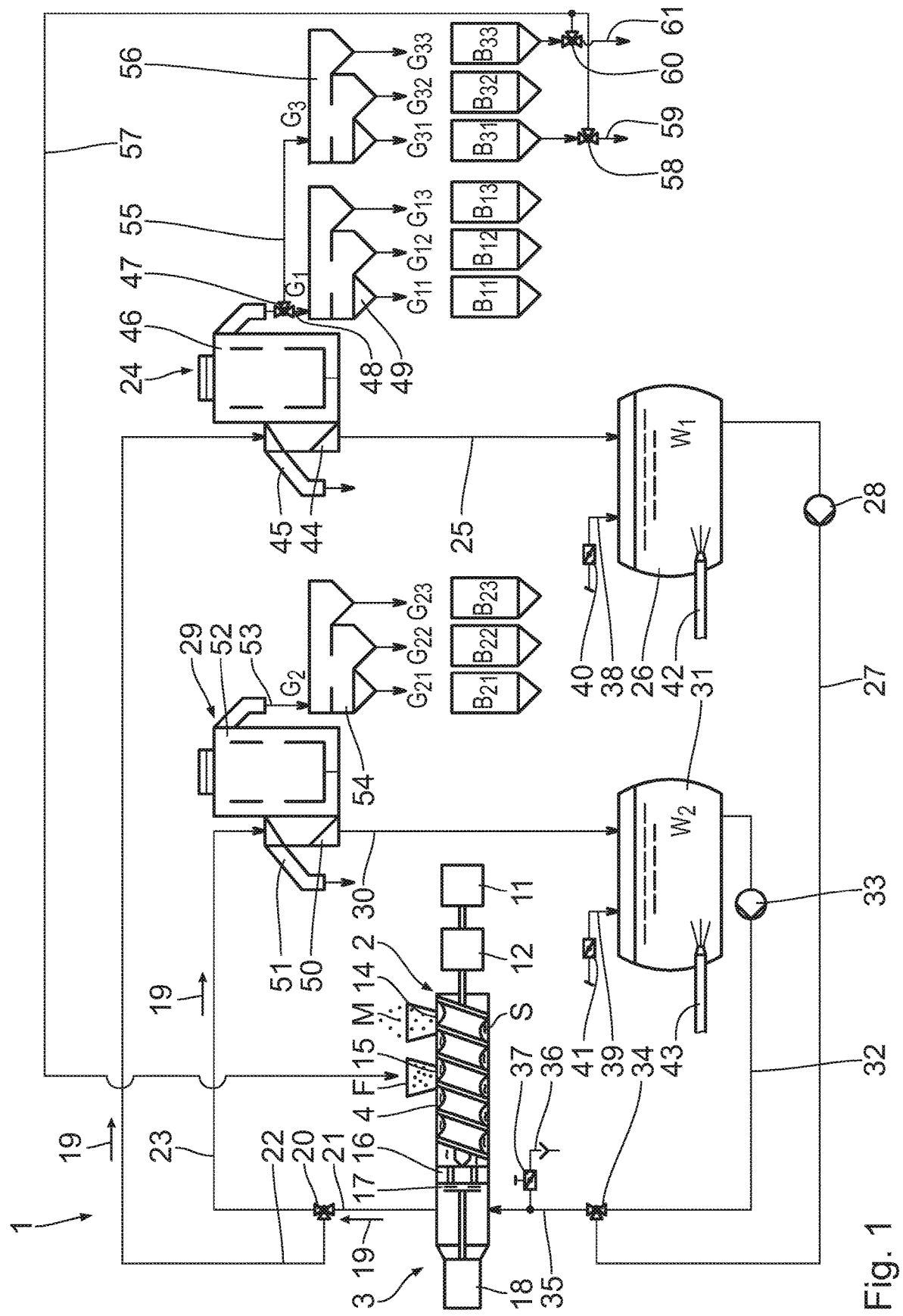
FIG. 1 is a schematic view of a device for selectively producing dyed and undyed plastic granulate according to a first exemplary embodiment.
Figure 2:
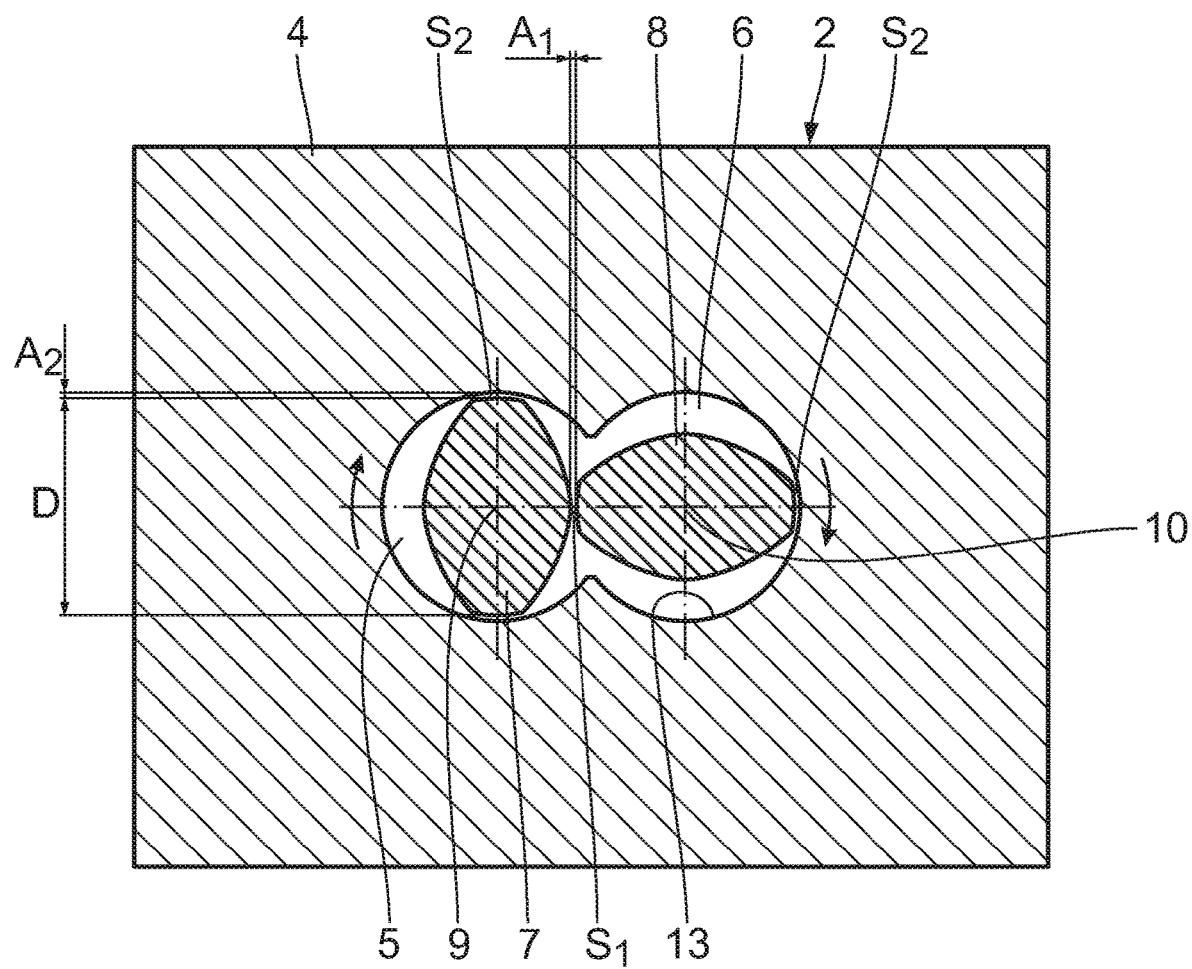
FIG. 2 is a sectional view of multi-shaft screw extruder of the device in FIG. 1.

Referring to the drawings, a first exemplary embodiment of the invention is described hereunder by means of FIGS. 1 and 2. A device 1 for producing dyed plastic granulate $G_1$ and undyed plastic granulate $G_2$ comprises a multi-shaft screw extruder 2 having an underwater pelletizing installation 3 disposed downstream. The multi-shaft screw extruder 2 has a housing 4 in which two mutually penetrating housing bores 5, 6 are configured. Treatment element shafts 7, 8 are disposed so as to be rotatable about associated rotation axes 9, 10 in the housing bores 5, 6. The treatment element shafts 7, 8 by a drive motor 11 are rotatingly drivable in the same direction, thus in identical rotating directions, by way of an associated transfer gearbox 12. The treatment element shafts 7, 8 are configured so as to mutually mesh in a tight manner and so as to scrape an internal wall 13 of the housing 4. To this end, the treatment element shafts 7, 8 are mutually disposed in such a manner that a gap $S_1$ delimited by the treatment element shafts 7, 8 has a dimension $A_1$, wherein the following applies to the dimension $A_1$ in relation to an external diameter D of the treatment element shafts 7, 8: $0.003 \leq A_1/D \leq 0.05$, in particular $0.004 \leq A_1/D \leq 0.035$, and in particular $0.011 \leq A_1/D \leq 0.02$.

Furthermore, the treatment element shafts 7, 8 conjointly with the internal wall 13 configure a respective gap $S_2$ which has an associated dimension $A_2$, wherein the following applies to the ratio of the dimension $A_2$ to the external diameter D: $0.004 \leq A_2/D \leq 0.03$, in particular $0.005 \leq A_2/D \leq 0.025$, and in particular $0.012 \leq A_2/D \leq 0.019$.

The multi-shaft screw extruder 2 furthermore has a first infeed opening 14 and a second infeed opening 15 which are configured in the housing 4 and open into the housing bores 5, 6. The infeed openings 14, 15 serve for separately feeding undyed plastic material M, or plastic material M of natural color, respectively, thus pulverulent plastic material M, for example, and dying agent F, for example of pulverulent carbon black or masterbatch granulate containing carbon black. A perforated plate 16 is disposed on the discharge side on the multi-shaft screw extruder 2, a plastic melt S in the form of plastic strands is generated by the multi-shaft screw extruder 2 being capable of being extruded through said perforated plate 16, said plastic strands in turn being capable of being cut to the plastic granulate $G_1$ or $G_2$, respectively, by means of at least one rotatingly drivable cutting blade 17. The at least one cutting blade 17 is rotatingly drivable by means of a blade drive motor 18. The perforated plate 16, the at least one cutting blade 17, and the blade drive motor 18 are part of the underwater pelletizing installation 3.

A granulate changeover unit 20 which diverges a discharge line 21 of the underwater pelletizing installation 3 into a first conveying line 22 and a second conveying line 23 is disposed in a conveying direction 19 downstream of the underwater pelletizing installation 3. The granulate changeover unit 20 is preferably configured as a granulate turnout. The following explanations apply to a granulate changeover unit 20 of arbitrary configuration.

The first conveying line 22 forms the start of a first post-treatment circuit in which a first separator installation 24, a first pelletizing water return feed line 25, a first pelletizing water container 26, and a first pelletizing water infeed line 27 having a first pelletizing water pump 28 are disposed in succession in the conveying direction 19. In an analogous manner, the second conveying line 23 forms the start of a second post-treatment circuit in which a second separator installation 29, a second pelletizing water return feed line 30, a second pelletizing water container 31, and a second pelletizing water infeed line 32 having a second pelletizing water pump 33 are disposed in succession in the conveying direction 19. The post-treatment circuits are disposed so as to be mutually parallel. The pelletizing water infeed lines 27 and 32 by means of a pelletizing water changeover unit 34 are reunited such that pelletizing water $W_1$ of the first post-treatment circuit or pelletizing water $W_2$ of the second post-treatment circuit is capable of being fed to the underwater pelletizing installation 3 by way of an infeed line 35. The pelletizing water changeover unit 34 is preferably configured as a pelletizing water turnout. The following explanations apply to a pelletizing water changeover unit 34 of any arbitrary configuration. An outlet line 36 which can be opened or closed by way of a shut-off element 37 proceeds from the infeed line 35.

The pelletizing water containers 26, 31 have in each case one fresh water infeed line 38, 39 having an associated shut-off element 40, 41, as well as a pelletizing water heater 42, 43.

The first separator installation 24 for separating the pelletizing water $W_1$ and the dyed plastic granulate $G_1$ comprises a first separator 44, a first agglomerate separator 45, and a first granulate dryer 46. A color granulate changeover unit 47 in the conveying direction 19 is disposed downstream of the granulate dryer 46. The color granulate changeover unit 47 is preferably configured as a color granulate turnout. The following explanations apply to a color granulate changeover unit 47 of arbitrary configuration. Proceeding from the color granulate changeover unit 47, a first classification line 48 extends to a first classification installation 49. The first classification installation 49 serves for classifying the dyed granulate $G_1$ and, for example, has screens (not illustrated in more detail) which classify the dyed plastic granulate $G_1$ into an undersize $G_{11}$, a standard size $G_{12}$, and an oversize $G_{13}$. The first classification installation 49 on the exit side opens into a storage container $B_{11}$ for the undersize $G_{11}$, a storage container $B_{12}$ for the standard size $G_{12}$, and a storage container $B_{13}$ for the oversize $G_{13}$ of the dyed plastic granulate $G_1$.

The second separator installation 29 for separating the pelletizing water $W_2$ and the undyed plastic granulate $G_2$ has a second separator 50, a second agglomerate separator 51, and a second granulate dryer 52. A second classification line 53 connects the second granulate dryer 52 directly to a second classification installation 54. The second classification installation 54 serves for classifying the undyed plastic granulate $G_2$ into an undersize $G_{21}$, a standard size $G_{22}$, and an oversize $G_{23}$. To this end, the second classification installation 54 has screens (not illustrated in more detail). A storage container $B_{21}$ for the undersize $G_{21}$, a storage container $B_{22}$ for the standard size $G_{22}$, and a storage container $B_{23}$ for the oversize $G_{23}$ are disposed on the exit side of the second classification installation 54.

Furthermore, a third classification line 55 which leads to a third classification installation 56 extends so as to proceed from the color granulate changeover unit 47. The third classification installation 56 serves for classifying impure plastic granulate $G_3$ which is created in a transition period after the conversion from the production of the dyed plastic granulate $G_1$ to the production of the undyed plastic granulate $G_2$ and is capable of being separated by means of the color granulate changeover unit 47 and is capable of being classified by means of the third classification installation 56. The third classification installation 56 thus serves for classifying the impure plastic granulate $G_3$ into an undersize $G_{31}$, a standard size $G_{32}$, and an oversize $G_{33}$. To this end, screens (not illustrated in more detail) are disposed in the third classification installation 56. A storage container $B_{31}$ for the undersize $G_{31}$, storage container $B_{32}$ for the standard size $G_{32}$, and a storage container $B_{33}$ for the oversize $G_{33}$ of the impure plastic granulate $G_3$ are disposed on the exit side of the third classification installation 56.

In order for the undersize $G_{31}$ and the oversize $G_{33}$ of the impure plastic granulate $G_3$ to be returned to the multi-shaft screw extruder 2, a return feed line 57 is disposed between the storage container $B_{31}$, or the storage container $B_{33}$, respectively, and the multi-shaft screw extruder 2. To this end, a first return feed changeover unit 58 is disposed on the exit side of the storage container $B_{31}$ such that the storage container $B_{31}$ at the exit side opens into the return feed line 57 or a first outward transport line 59. In an analogous manner, a second return feed changeover unit 60 is disposed on the exit side of the storage container $B_{33}$ such that the container $B_{33}$ at the exit side opens either into the return feed line 57 or a second outward transport line 61. The return feed line 57 by way of the first infeed opening 14 or the second infeed opening 15 opens into the housing bores 5, 6. Feeding by way of the second infeed opening 15 is illustrated in an exemplary manner in FIG. 1. The return feed changeover units 58, 60 are preferably configured as return feed turnouts.

The functioning mode of the device 1 is as follows:

The production of the undyed plastic granulate $G_2$ is described first. The multi-shaft screw extruder 2 is fed undyed plastic material M, or plastic material M of natural color, respectively, by way of the first infeed opening 14. The plastic material M is pulverulent, for example. The plastic material M is melted by means of the treatment element shaft 7, 8 such that an undyed plastic melt S is discharged from the housing bores 5, 6 and undyed plastic strands are extruded through the perforated plate 16. The undyed plastic strands by means of the rotating at least one cutting blade 17 are cut to the undyed plastic granulate $G_2$. The plastic granulate $G_2$ by means of the pelletizing water $W_2$ is discharged from the underwater pelletizing installation 3 by way of the discharge line 21 and by way of the granulate changeover unit 20 is fed to the second post-treatment circuit. The undyed plastic granulate $G_2$ by way of the second conveying line 23 makes its way to the second separator installation 29 which separates the undyed plastic granulate $G_2$ from the pelletizing water $W_2$ and dries said undyed plastic granulate $G_2$. The undyed plastic granulate $G_2$ by way of the second classification line 53 is subsequently fed to the second classification installation 54. The second classification installation 54 classifies the undyed plastic granulate $G_2$ into the undersize $G_{21}$, the standard size $G_{22}$, and the oversize $G_{23}$, said sizes for marketing or outward transporting being stored in the associated storage containers $B_{21}$, $B_{22}$, and $B_{23}$.

The pelletizing water $W_2$ by way of the second pelletizing water return feed line 30 makes its way to the second pelletizing water container 31 and from there, by means of the second pelletizing water pump 33, by way of the second pelletizing water infeed line 32 and the pelletizing water changeover unit 34 back to the infeed line 35 which re-feeds the pelletizing water $W_2$ to the underwater pelletizing installation 3. If required, pelletizing water $W_2$ in the pelletizing water container 31 is topped up by way of the second fresh water infeed line 39, and the pelletizing water $W_2$ is brought to a desired temperature by way of the second pelletizing water heater 43.

The conversion of the production from the undyed plastic granulate $G_2$ to the dyed plastic granulate $G_1$ is possible in a simple manner. In order for the dyed plastic granulate $G_1$ to be produced, infeeding of the plastic material M is interrupted, and the multi-shaft screw extruder 2 is operated until empty. The granulate changeover unit 20 and the pelletizing water changeover unit 34 are subsequently converted, and plastic material M is fed to the multi-shaft screw extruder 2 by way of the first infeed opening 14, and dyeing agent F is fed by way of the second infeed opening 15. The dyeing agent F is configured so as to be pulverulent, for example, or is bound in a masterbatch granulate. The dyeing agent F is carbon black, for example. Additionally or alternatively, the screw extruder by way of the return feed line 57 is fed the undersize $G_{31}$ and/or the oversize $G_{33}$ of the impure plastic granulate $G_3$ which is stored in the associated storage containers $B_{31}$ and $B_{33}$. The dyed plastic melt S is generated by means of the treatment element shaft 7, 8 in the housing bores 5, 6 and is discharged through the perforated plate 16. The extruded dyed plastic strands by means of the at least one cutting blade 17 are cut to the dyed plastic granulate $G_1$. The dyed plastic granulate $G_1$ by means of the pelletizing water $W_1$ is discharged from the underwater pelletizing installation 3 by way of the discharge line 21 and fed to the first post-treatment circuit. The dyed plastic granulate $G_1$ by way of the first conveying line 22 is fed to the first separator installation 24 which separates the dyed plastic granulate $G_1$ from the pelletizing water $W_1$ and dries said dyed plastic granulate $G_1$. The dried dyed plastic granulate $G_1$ by way of the color granulate changeover unit 47 is fed to the first classification line 48 and the downstream first classification installation 49. The first classification installation 49 classifies the dyed plastic granulate $G_1$ into the undersize $G_{11}$, the standard size $G_{12}$, and the oversize $G_{13}$ which for outward transporting or marketing, respectively, are stored in the associated storage containers $B_{11}$, $B_{12}$, and $B_{13}$.

The pelletizing water $W_1$ by way of the first pelletizing water return feed line 25 makes its way to the first pelletizing water container 26 and by means of the first pelletizing water pump 28 from there by way of the first pelletizing water infeed line 27 and the pelletizing water changeover unit 34 back to the infeed line 35 which re-feeds the pelletizing water $W_1$ to the underwater pelletizing installation 3. If required, pelletizing water $W_1$ in the pelletizing water container 26 is topped up by way of the first fresh water infeed line 38, and the pelletizing water $W_1$ is brought to a desired temperature by way of the first pelletizing water heater 42.

The conversion of the production from the dyed plastic granulate $G_1$ to the undyed plastic granulate $G_2$ is problematic since the multi-shaft screw extruder 2 and the underwater pelletizing installation 3 are contaminated by the dyeing agent F. In order for the production to be converted, infeeding of dyeing agent F and/or of the undersize $G_{31}$ or the oversize $G_{33}$, respectively, of the impure plastic granulate $G_3$ is interrupted such that the multi-shaft screw extruder 2 is exclusively fed the plastic material M. Moreover, the color granulate changeover unit 47 is converted such that the impure plastic granulate $G_3$ now created is fed to the third classification installation 56 by way of the third classification line 55. The multi-shaft screw extruder 2 and the underwater pelletizing installation 3 in a transition period carry out self-cleaning in which the plastic melt S generated in the multi-shaft screw extruder 2 by virtue of the tightly meshing configuration of the treatment element shafts 7, 8 and the scraping of the internal wall 13 removes residual dyeing agent F from the multi-shaft screw extruder 2 and subsequently cleans the perforated plate 16 and the at least one cutting blade 17. The impure plastic granulate $G_3$ created in the underwater pelletizing installation 2 by way of the granulate changeover unit 20 is fed to the first post-treatment circuit and by way of the first separator installation 24 is separated from the pelletizing water $W_1$ and is fed to the third classification installation 56 in the manner already described. The third classification installation 56 classifies the impure plastic granulate $G_3$ into the undersize $G_{31}$, the standard size $G_{32}$, and the oversize $G_{33}$ which are stored in the associated storage containers $B_{31}$, $B_{32}$, and $B_{33}$. Depending on the economics, the undersize $G_{31}$ and the oversize $G_{33}$ by way of the return feed changeover units 58, 60 can be stored for onward transporting or marketing, respectively, or for return feeding. The standard size is merely stored for onward transporting or marketing, for example.

Once self-cleaning in the transition period has been completed, infeeding the plastic material M is interrupted and the multi-shaft screw extruder 2 is operated until empty. The granulate changeover unit 20 and the pelletizing water changeover unit 34 are subsequently converted. The undyed plastic granulate $G_2$ is now produced again and fed to the second post-treatment circuit by infeeding the plastic material M, in the manner already described.

The device 1 according to the invention enables the selective production of dyed plastic granulate $G_1$ and of undyed plastic granulate $G_2$ by way of only a single multi-shaft screw extruder 2 and a single underwater pelletizing installation 3. On account thereof, the complexity in terms of machine technology is comparatively minor. The impure plastic granulate $G_3$ that is produced in the conversion of the production from the dyed plastic granulate $G_1$ to the undyed plastic granulate $G_2$ is fed to the first post-treatment circuit and separated. Depending on the economics, the impure plastic granulate $G_3$ is marketed or in the subsequent production of the dyed plastic granulate $G_1$ is fed back to the multi-shaft screw extruder 2 and further processed. The device 1 thus enables a simple, flexible and economical production selectively of dyed plastic granulate $G_1$ and undyed plastic granulate $G_2$.

Figure 3:
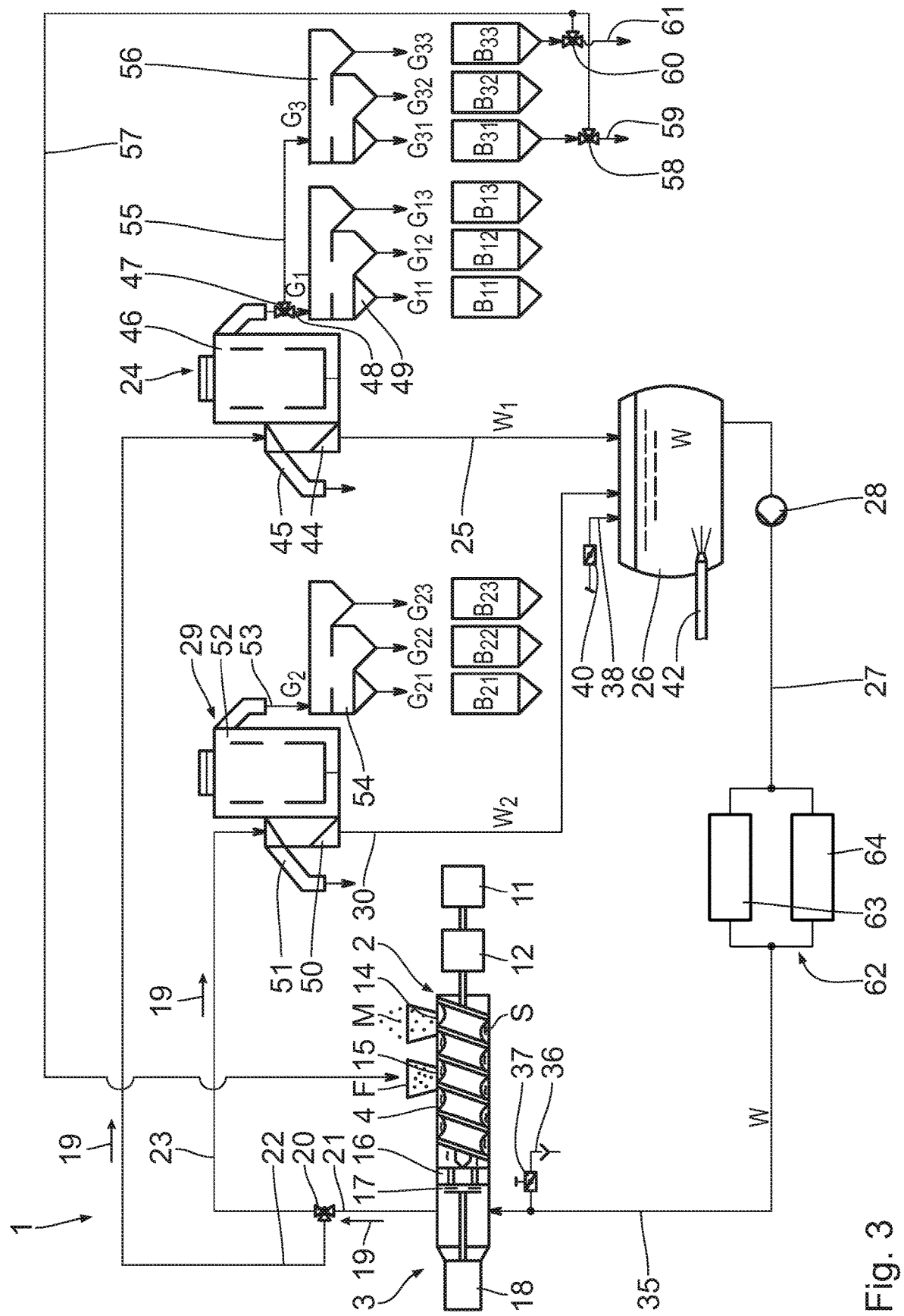
FIG. 3 is a schematic view of a device for selectively producing dyed and undyed plastic granulate according to a second exemplary embodiment.

A second exemplary embodiment of the invention is described hereunder by means of FIG. 3. As opposed to the first exemplary embodiment, the first post-treatment circuit comprises the first conveying line 22, the first separator installation 24, and the first pelletizing water return feed line 25, as well as a pelletizing water container 26 that is common to the second post-treatment circuit, and a common pelletizing water infeed line 27 having a common pelletizing water pump 28 and a common filter installation 62. Accordingly, the second post-treatment circuit comprises the second conveying line 23, the second separator installation 29, the second pelletizing water return feed line 30, as well as the common pelletizing water container 26, and the common pelletizing water infeed line 27 having the common pelletizing water pump 28 and the common filter installation 62.

Proceeding from the granulate changeover unit 20, the post-treatment circuits are separate up to the pelletizing water return feed lines 25, 30, and from the pelletizing water container 26 up to the pelletizing water infeed line 27 configure a common post-treatment circuit. On account thereof, the pelletizing water changeover unit 34 is dispensed with such that the pelletizing water infeed line 27 transitions to the infeed line 35. The filter installation 62 comprises two pelletizing water filters 63, 64 which are disposed so as to be mutually parallel in the pelletizing water infeed line 27. The pelletizing water filters 63, 64 can be operated or conjointly or separately by way of shut-off elements (not illustrated in more detail) of the filter installation. The pelletizing water filters 63, 64 can thus be operated conjointly or so as to exclude the pelletizing water filter 63 or so as to exclude the pelletizing water filter 64. Servicing or replacing the pelletizing water filter 63, 64 is possible in a simple manner on account thereof. The pelletizing water $W_1$ from the first separator installation 24 makes its way into the common pelletizing water container 26 by way of the first pelletizing water return feed line 25. Accordingly, the pelletizing water $W_2$ from the second separator installation 29 makes its way into the common pelletizing water container 26 by way of the second pelletizing water return feed line 30. The mixed pelletizing water W by means of the pelletizing water pump 28 is fed to the filter installation 62 by way of the pelletizing water infeed line 27. Plastic granulate $G_1$, $G_2$ and/or $G_3$ which is located in the pelletizing water W is filtered from the latter by means of the pelletizing water filters 63, 64 in the filter installation 62. The pelletizing water W which after the filter installation 62 is fed to the underwater pelletizing installation 3 by way of the infeed line 35 is thus purified of residual plastic granulate $G_1$, $G_2$ and/or $G_3$.

Reference in terms of the further construction and of the further functioning mode of the device 1 is made to the first exemplary embodiment.

While specific embodiments of the invention have been shown and described in detail to illustrate the application of the principles of the invention, it will be understood that the invention may be embodied otherwise without departing from such principles.

The invention claimed is:

1. A device for producing plastic granulate, the device comprising:
   a multi-shaft screw extruder for providing a plastic melt;
   an underwater pelletizing installation for producing plastic granulate that is located in pelletizing water from the plastic melt;
   a granulate changeover unit configured for separating dyed plastic granulate and undyed plastic granulate and configured for separating a post-treatment into a first post-treatment circuit for the dyed plastic granulate and a second post-treatment circuit for the undyed plastic granulate, the granulate changeover unit being disposed downstream of the underwater pelletizing installation in a conveying direction;
   a first separator installation configured for separating the dyed plastic granulate from the pelletizing water, the first separator installation being disposed downstream of the granulate changeover unit in the conveying direction and being part of the first post-treatment circuit; and
   a second separator installation configured for separating the undyed plastic granulate from the pelletizing water, the second separator installation being disposed downstream of the granulate changeover unit in the conveying direction and being part of the second post-treatment circuit and the second separator installation being parallel with the first separator installation.

2. The device as claimed in claim 1, wherein a pelletizing water changeover unit for feeding the pelletizing water from the first separator installation or the second separator installation to the underwater pelletizing installation is disposed between the first separator installation, the second separator installation and the underwater pelletizing installation.

3. The device as claimed in claim 2, wherein a first pelletizing water container is disposed between the first separator installation and the pelletizing water changeover unit, and a second pelletizing water container is disposed between the second separator installation and the pelletizing water changeover unit.

4. The device as claimed in claim 2, wherein a first pelletizing water pump is disposed between the first separator installation and the pelletizing water changeover unit, and a second pelletizing water pump is disposed between the second separator installation and the pelletizing water changeover unit.

5. The device as claimed in claim 1, wherein a pelletizing water container for feeding the pelletizing water from the first separator installation and the second separator installation is disposed between the first separator installation, the second separator installation and the underwater pelletizing installation.

6. The device as claimed in claim 1, wherein a pelletizing water pump is disposed between the first separator installation, the second separator installation and the underwater pelletizing installation.

7. The device as claimed in claim 6, wherein the pelletizing water pump is disposed between a pelletizing water container and the underwater pelletizing installation.

8. The device as claimed in claim 1, wherein at least one filter installation is disposed between the underwater pelletizing installation and at least one of the first separator installation and the second separator installation.

9. The device as claimed in claim 8, wherein the at least one filter installation comprises at least two pelletizing water filters disposed parallel to each other.

10. The device as claimed in claim 8, wherein the at least one filter installation is disposed between a pelletizing water container and the underwater pelletizing installation.

11. The device as claimed in claim 1, wherein a color granulate changeover unit for separating dyed plastic granulate and impure plastic granulate in a changeover of production from dyed plastic granulate to undyed plastic granulate is disposed downstream of the first separator installation.

12. The device as claimed in claim 11, wherein at least one first storage container for storing the dyed plastic granulate, and at least one second storage container for storing the impure plastic granulate are disposed downstream of the color granulate changeover unit.

13. The device as claimed in claim 12, wherein a return feed line for returning the impure plastic granulate in the production of the dyed plastic granulate extends from the at least one second storage container to the multi-shaft screw extruder.

14. The device as claimed in claim 12, wherein a classification installation for classifying the impure plastic granulate is disposed between the color granulate changeover unit, the at least one second storage container and another second storage container.

15. The device as claimed in claim 1, wherein the multi-shaft screw extruder comprises a first infeed opening for feeding undyed plastic material, and the multi-screw extruder comprises a second infeed opening for feeding at least one of dyeing agent and impure plastic granulate, wherein a first pelletizing water container is connected to the first separator installation, the first pelletizing water container being configured to receive the pelletizing water from the first separator installation, wherein a second pelletizing water container is connected to the second separator installation, the second pelletizing water container being configured to receive the pelletizing water from the second separator installation.

16. The device as claimed in claim 1, wherein the multi-shaft screw extruder comprises a housing having at least two mutually penetrating housing bores configured in the housing, wherein associated treatment element shafts are rotatingly drivable in the at least two mutually penetrating housing bores, the associated treatment element shafts being configured to mutually mesh and to scrape an internal wall of the housing.

17. A method for producing plastic granulate, the method comprising the following method steps:
providing a device for producing plastic granulate, the device comprising a multi-shaft screw extruder for providing a plastic melt, an underwater pelletizing installation for producing plastic granulate that is located in pelletizing water from the plastic melt, a granulate changeover unit configured for separating dyed plastic granulate and undyed plastic granulate and for separating a post-treatment into a first post-treatment circuit for the dyed plastic granulate and a second post-treatment circuit for the undyed plastic granulate, a first separator installation for separating the dyed plastic granulate from the pelletizing water and a second separator installation for separating the undyed plastic granulate from the pelletizing water, the granulate changeover unit being disposed downstream of the underwater pelletizing installation in a conveying direction, the first separator installation being disposed downstream of the granulate changeover unit in the conveying direction and being part of the first post-treatment circuit, the second separator installation being disposed downstream of the granulate changeover unit in the conveying direction and being part of the second post-treatment circuit and the second separator installation being parallel with the first separator installation;
producing the dyed plastic granulate via the multi-shaft screw extruder and the underwater pelletizing installation, and separating the dyed plastic granulate via the first separator installation;
changing over the granulate changeover unit;
producing the undyed plastic granulate via the multi-shaft screw extruder and the underwater pelletizing installation, and separating the undyed plastic granulate via the second separator installation.

18. The method as claimed in claim 17, wherein the granulate changeover unit is converted after a start of production of the undyed plastic granulate, and impure plastic granulate created up to conversion of the granulate changeover unit is separated via the first separator installation and a downstream color granulate changeover unit.

19. The method as claimed in claim 18, wherein the impure plastic granulate in a subsequent production of the dyed plastic granulate is at least partially fed to the multi-shaft screw extruder.

20. The method as claimed in claim 17, wherein a pelletizing water changeover unit is converted.

21. The method as claimed in claim 17, wherein the pelletizing water from at least one of the first separator installation and the second separator installation, prior to being fed to the underwater pelletizing installation, is filtered via at least one filter installation.

\* \* \* \* \*